United States Patent Office 3,457,844
Patented July 29, 1969

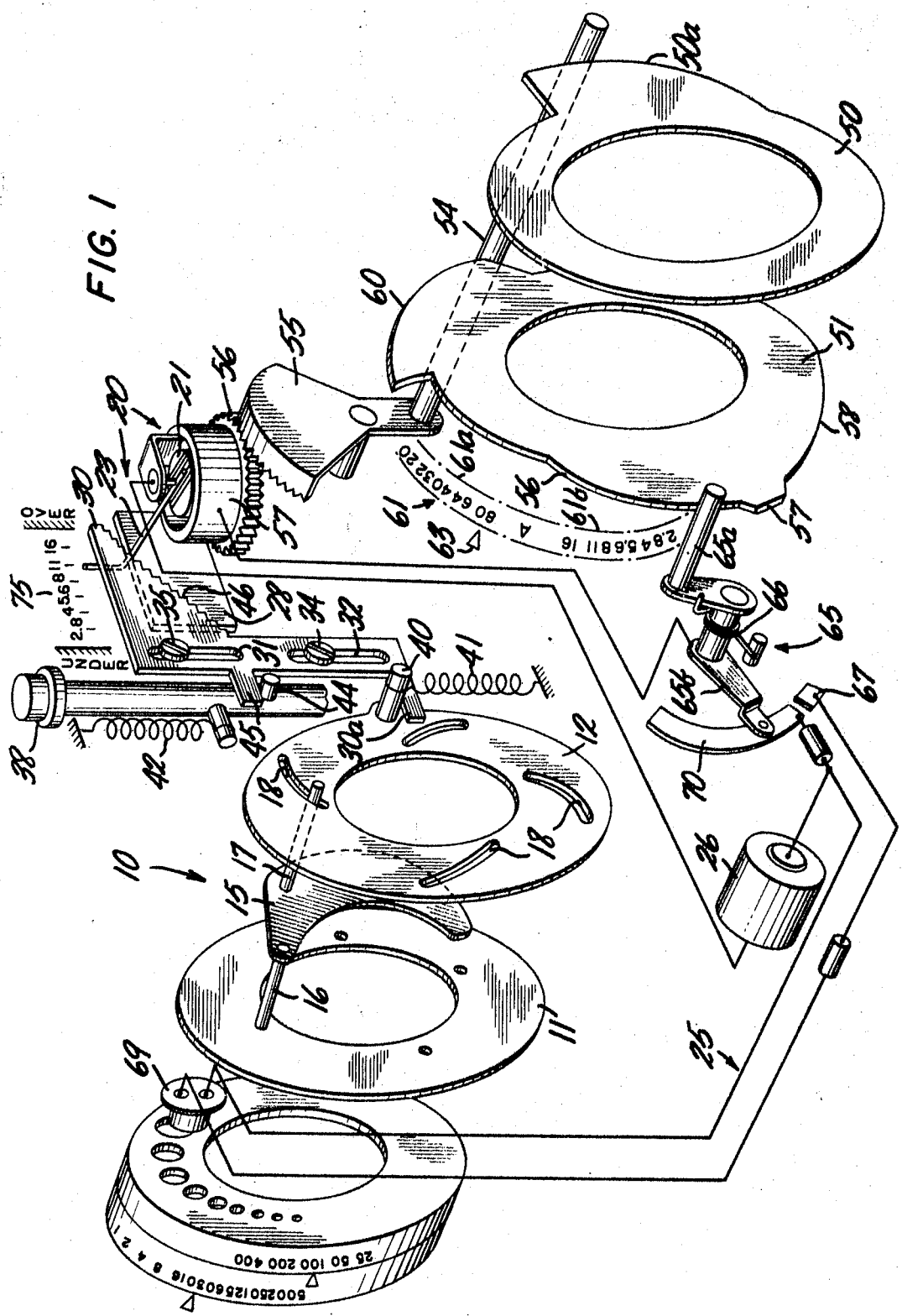

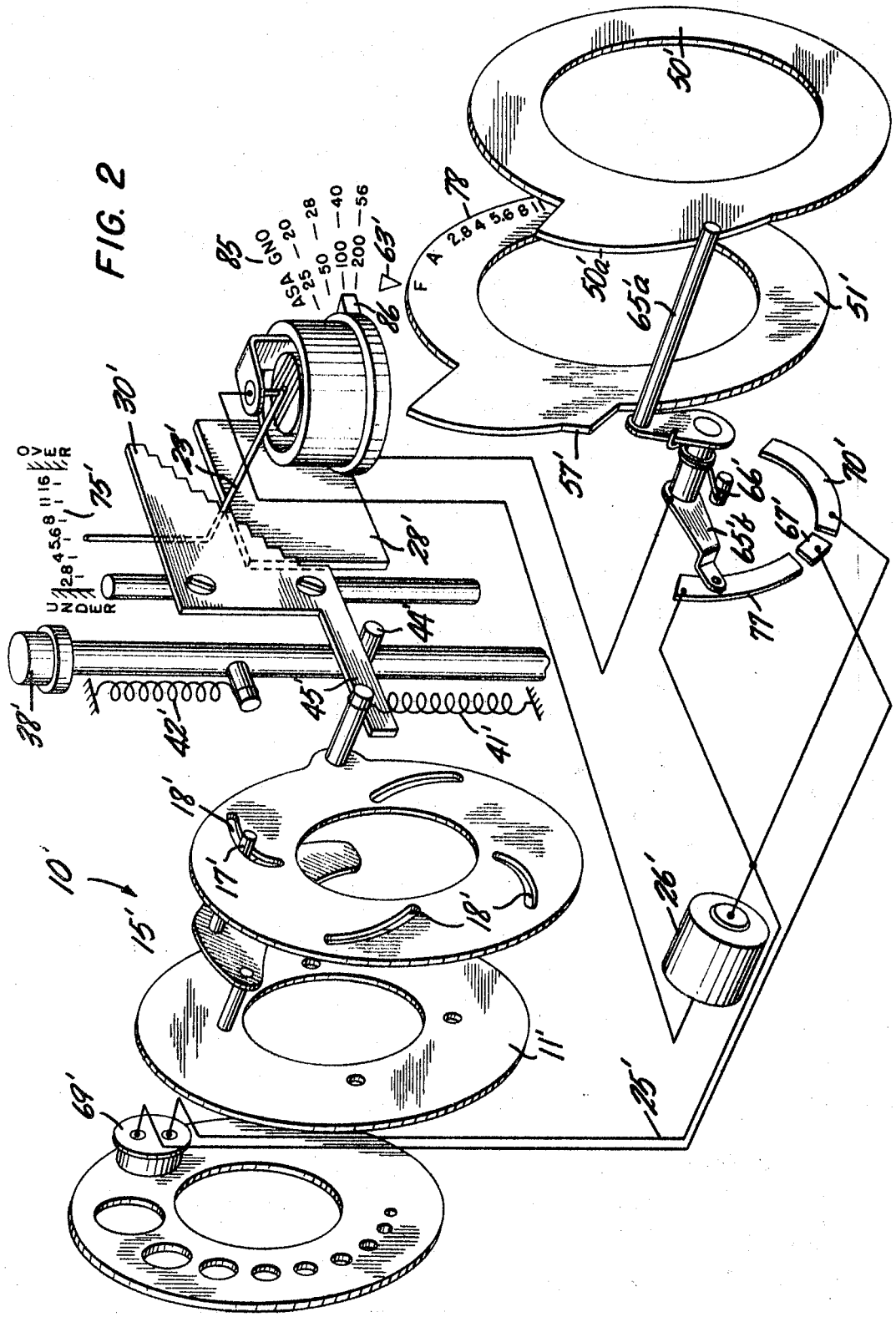

3,457,844
PHOTOGRAPHIC CAMERA WITH FLASH
EXPOSURE MECHANISM
Kiyoshi Kitai, Tokyo, Japan, assignor to Kabushiki Kaisha
Hattori, Tokeiten, Tokyo, Japan,
Filed May 17, 1966, Ser. No. 550,817
Claims priority, application Japan, May 20, 1965,
40/29,284
Int. Cl. G01j 1/16
U.S. Cl. 95—10  7 Claims

ABSTRACT OF THE DISCLOSURE

A photographic camera having a deflectable element movable to deflected positions in dependence upon desired exposure aperture settings and determining the aperture settings as a function of the distance to the object being photographed, film sensitivity values, and light inputs. The exposure apertures are determined by a plate operating a diaphragm and movable to positions determined by engaging the deflectable element with a stepped edge on the plate and thereby arresting the movement of the plate in a direction for operating the diaphragm to variably define the size of the exposure apertures.

---

The present invention relates generally to photographic cameras and more particularly to mechanism for setting values or sizes of the exposure aperture for effecting photographic exposures.

A principal object of the present invention is to provide an improved and simplified automatic exposure-setting mechanism for a photographic camera.

Another object is to provide a new and improved mechanism for setting diaphragm aperture values of a camera in accordance with a desired value which may be a function of either or both a guide number, representative of a flash bulb range, for example, and a determined distance.

Still another object of the invention is to provide a simple and improved mechanism for setting the diaphragm apertures of a photographic camera by automatic operation, manually, and various combinations of control inputs.

According to the invention, a photographic camera is provided with diaphragm means operable selectively to effect an exposure aperture of the same and different sizes for effecting photographic exposures. Control means including a movable member operable electrically and manually to different positions representative of different value settings for different sizes of the aperture are provided in the camera. The control means is connected to automatic means having a circuit means including light-responsive means, for example, a photo electric device, for selectively and automatically positioning the movable member to the positions thereof representative of the openings or settings of the diaphragm aperture. The light-responsive means, of course, operates to sense light being sensed in a field in which a subject to be photographed is disposed.

Manually operated means are provided operably connected to the control means for selectively positioning the movable member to control sizes of the diaphragm aperture. This manual control means comprises manually operated first means which are used to move the movable member according to selected inputs representative of determined distances and includes second means by which the positions of the movable member can be varied as a function of selected indicia or value settings. The two, first and second means, of the manual means may be operated to apply a cumulative input to the movable member or the second means thereof may be used to apply an input to position the movable member independent of the input of the first manual control means.

Other features and advantages of the mechanism for variably setting diaphragm exposure settings, in accordance with the present invention, will be better understood as described in the following specification and appended claims, in conjunction with the following drawings in which:

FIG. 1, is a diagrammatic exploded view of a first embodiment of mechanism according to the invention; and FIG. 2, is a second diagrammatic exploded view of another embodiment of mechanism according to the invention.

According to the drawing, the camera case is not shown and the components of the camera and mechanism of the invention are illustrated diagrammatically in relative positions. As shown in FIG. 1, diaphragm means 10 comprises coaxial cage members 11, 12, which are annular and mount diaphragm blades operable to an open position and a closed position for defining variable openings or sizes of a diaphragm aperture. In the drawing, only a single blade 15 is illustrated as being pivotally mounted by a pivot 16 on the diaphragm cage member 11 and a second pin 17 is disposed in an arcuate slot 18 in the second cage member 12 for angularly pivoting the blade as the cage member 12 is rotated angularly, as later explained. The second cage member 12 is, or course, rotatable and has a plurality of arcuate guide slots comparable to the slot 18 in which are disposed pins of other diaphragm blades, not shown, which jointly define the camera aperture.

In order to set the various sizes or values of the exposure apertures, control means 20, having a galvanometer, is provided. The galvanometer has an armature or moving coil 21 which is free to rotate angularly and position a pointer 23 to variable or different positions representative of the desired extent of opening or setting of the diaphragm aperture. The galvanometer is electrically energized by a circuit 25 having a power source 26 and operating as hereinafter explained.

As part of the control means, the aperture-setting mechanism of the invention is provided with a fixed plate 28 over which the pointer extends and a selectively operated, movable plate 30 having elongated slots 31, 32 so that it can be moved up and down on support means and screws 34, 35 under control of a manually and selectively operated release button 38. The movable plate 30 is provided with an extension 30a cooperative with a pin 40 on the diaphragm cage member 12 and is biased in a direction downwardly by a spring 41, the force of which is offset by a spring 42 biasing the release button 38 upwardly and the removable plate 30 upwardly therewith by means of a pin 44 cooperative with an extension 45 on the movable plate 30. The movable plate and release button are thus constantly biased to a raised position constituting the "rest" position thereof.

The control plate 30 is provided with a diagonally stepped edge 46. In the position illustrated in FIG. 1, the release button 38 is illustrated in a depressed condition so that the plate 30 is in a lowered position in which one of the "steps" in the plate has engaged the pointer 23 upon downward travel in dependence upon the angular position of the pointer. The downward movement of the plate can therefore be limited or defined so that the downward travel, and therefore the extent of rotation of the cage member 12 is preset and controlled so that the extent of opening of the diaphragm is in accordance with the "step" engaging the pointer determined by the position of the pointer 23 which is representative of the value setting of the diaphragm and aperture defined thereby. It can be seen that depending upon the position of the pointer 23, various positions of angular settings will define various aperture settings.

As explained hereinafter in detail, the control mechanism can be set by automatic means that apply control inputs to the galvanometer for positioning the pointer 23 as a function of light in a field in which a subject is being photographed. Moreover, as explained hereinafter, mechanism is provided for variably setting the resistance value of a circuit of the automatic means so that the value setting defined by the pointer 23 can be set as a function of an established value determined from a scale of indicia or guide numbers. Moreover, the manual means provides for introducing this setting jointly with or independly of a setting established as a function of the distance determined from the camera to the subject being photographed. One embodiment provides for an input to the control mechanism including a setting value in accordance with the film sensitivity.

In order to carry the setting functions, the invention provides an angularly rotatable, distance-setting ring 50 and a second coaxial ring 51 aligned, for example, coaxially with the objective of the camera, not shown. The distance adjusting or setting ring 50 is provided with a cam portion 50a. A pin 54 is constantly biased into engagement in a direction for engaging the profile of the two adjusting or setting rings 50, 51. When the pin 54 bears on the cam 50a a pivotally mounted gear sector 55 meshed with a gear 56 on the galvanometer is rotated angularly so that an angular input is applied to the "stator" 57 of the galvanometer so that the deflected position of the pointer 23 will be defined dependent in part upon the value of the setting established by the distance ring 50. The distance value can be established by rotating the distance-setting ring relative to a scale, not shown.

The manually operated ring 51 is provided with a profile cam portion 56, a coaxial profile cam 57 and a profile cam portion 58. A profile cam 60 disposed on the ring 51 is disposed relative to the concentric cam 57 such that if the ring 51 is rotated to a position in which scale indicia 61 associated therewith is positioned such that a mark "A" is disposed opposite an index 63, the concentric cam 57 will actuate a cam follower arm 65a, of a two-arm contact 65 biased by a spring 66 into engagement with the profile of the ring 51, to a position in which a contact arm 65b is positioned engaging an electrical contact 67 providing a closed circuit from a photo-electric device 69 so that the control of the control means 20 is solely automatically as a function of light being sensed in a field in which the image or subject is to be photographed. At the same time that the cam 57 biases the lever system 65 as above described, the cam 60 is rotated into a position in which it rotates the pin 54 into a position angularly so that it is disengaged from the cam 50a and the apparatus will have the aperture settings set automatically indendently of the manual setting means.

The aperture setting mechanism of the invention provides for inputs into the control means 20 of values representative of certain indicia representative of the range of the flash bulb mechanism, not shown, and a range of manual settings of diaphragm opening or aperture values. This is accomplished by variably changing the resistance of the circuit 25. The inputs are applied by the cam ring 51. This ring is constructed so that the various cam portions have a profile for variably moving the connector or contact arm 65b on a resistor 70 so that the electrical value applied to the galvanometer of the control means will vary and thereby position the movable or pointer member 23 to the various control positions. The values are established by the scales 61. A scale 61a has values, corresponding to the flash bulb range, so that when disposed opposite the index 63 the cam portion 56 cooperates with the cam follower arm 65a and when a second scale 61b, the manual settings scale, is positioned opposite the index 63, the cam portion 58 will cooperate with the cam follower arm 65a so that the proper resistance change is established in the control circuit 25 such that the galvanometer pointer is then disposed as to the desired position or input set with the ring 51.

It can be seen that from the structure above described that the distance ring 50 and the adjusting ring 51 can be actuated so that the control input to the control means 20 is a cumulative value established by the manual control rings 50, 51. Moreover, the ring 51 can be rotated into an angular position in which the cam portion 60 which has a profile length greater than the cam 57 will cause the distance ring 50 to be disconnected from the control means, as before described, relative to the actuation of the pin 54 and thereafter manual control of the control inputs can be made under control of the control ring 51 independently of the distance-setting ring 50.

Regardless of the combination of inputs being applied to the control means 20, the camera user can ascertain whether the camera has been set to the desired aperture setting on a scale 75 on which is indicated the flash bulb range and the fact that the camera is set for over or under this range as can be seen from the drawing.

A second embodiment of the invention is illustrated in FIG. 2 in which the components thereof have reference numerals primed that correspond to the corresponding structure illustrated in FIG. 1. As can be seen in this figure, the distance ring 50' is provided with a cam portion 50'a that instead of applying an input to the control means 20 mechanically, can be actuated to a position in which it varies the resistance of a circuit 25' by: bearing on a cam follower arm 65'a and a resistor 77. The distance ring is rotated to a position in which the cam portion 50'a is engaged with the cam follower arm 65'a when the input settings to the control means 20' are to be applied with a ring 51' set for automatic flash exposure as later described which is the operation position shown in FIG. 2.

The ring 51' has the scales and indicia of the type heretofore described. As illustrated, when the indicium "A" is disposed opposite and index 63', a cam 57' is actuated to a position in which the cam will operate the electrical contact arm 65'b to a position for electrical connection to a contact 67' thereby disconnecting the manual inputs from a control means 20' so that diaphragm setting is effected solely under control of a photoelectric element 69'. Moreover, a scale 78 provided on the ring 51' provides for applying control inputs to the control means 21' by varying the electrical resistance of the circuit 25'. When the indicia of the scale 78 are disposed opposite the index 63', a cam portion 79 bears on the cam follower arm and the contact arm 65'b is actuated and variably positioned on the resistor 70' so that the manual input for setting the aperture is as before described relative to the embodiment in FIG. 1 and the resistor 70. The ring 51' has an indicium or mark "F" which when positioned opposite the index 63' the mechanism is set for automatic flash exposure and the setting is under control of the distance-setting ring 50', as before described.

Provision is made in the mechanism, according to the invention, for applying a control input to the control means 20' so that the variable settings of the diaphragm opening or aperture can take into consideration the sensitivity of the film being used in the camera. Thus, as illustrated in FIG. 2, a film sensitivity scale 85 may be provided on a suitable place on the camera and the galvanometer gear 56 is replaced by an indicator 86 which can be variably positioned thereby applying an input to the galvanometer so that the deflection of the pointer 23' is to a control position in which the position of the pointer will apply the proper control input to the final position of the diaphragm blades.

Those well understanding the art will understand that the distance adjusting ring can have limits built in thereto to preclude setting a distance in which an automatic flash exposure would be inffective. Furthermore, limit stops, not shown, can be used on the ring for adjusting distance. However, in the scale 75', the operator can see that when the pointer 23' moves either to the left or to the right off of the scale the aperture would not be properly controlled. The pointer will then indicate to the camera user that he is out of range of automatic flash exposure as described relative to the embodiment in FIG. 1. Furthermore, the resistors in the embodiments of the invention may be flat film resistors or made in other suitable configurations.

While preferred embodiments of the invention have been shown and described, it will be understood that many modifications and changes can be made within the true spirit and scope of the invention.

What I claim and desire to secure by Letters Patent is:

1. In a photographic camera, in combination, diaphragm means operably selectively to define an exposure aperture of the same and different sizes for effecting photographic exposures, control means comprising a galvanometer having a movable coil and a pointer mounted to move with said coil operable electrically and manually to different deflected positions relative to a given rest position thereof and representative of different value settings for different sizes of said aperture, automatic means having circuit means including light-responsive means for selectively and automatically positioning said movable pointer to said deflected positions to control sizes of said apertures, said manual means operably connected to said control means comprising manually operated first means to control the deflected positions of said movable pointer in operation according to selected inputs representative of determined distances, and means cooperative with said movable pointer and operably connected to said diaphragm means to variably set the value of said diaphragm aperture in dependence upon the deflected positions of said movable pointer, said means cooperative with said movable pointer comprising a selectively operated plate operated from a rest position in which said diaphragm is closed to an operative position ultimately defined by the deflected position of said pointer thereby operating said diaphragm means to define said aperture in accordance with the deflected positions of said pointer, said first means comprising a first cam ring, variable resistor means in said circuit means varied in resistance value by said cam ring, means operably connecting said cam ring to said resistor means, and said plate having a stepped edge having steps disposed diagonally thereon for engagement with said pointer during movement thereof whereby said pointer functions as a limit stop arresting travel of said plate in a direction operating said diaphragm means to define an exposure aperture.

2. A photographic camera according to claim 1, wherein said third cam means of the changing means causes the adjustment of the resistance value according to a manually selected aperture value.

3. In a photographic camera according to claim 1, including a second cam ring rotatable selectively to angular positions, means cooperative with said second cam ring and said control means to vary the deflected positions of said pointer.

4. In a photographic camera according to claim 3, in which said circuit means comprises another variable resistor means for varying the resistance of said another resistor with said second cam ring.

5. In a photographic camera according to claim 4 including means to vary the deflected positions of said pointer in accordance with the film sensitivity characteristics.

6. In a photographic camera, in combination, a diaphragm means operable to define an exposure aperture for effecting photographic exposure, a galvanometer comprising a movable coil having a pointer thereon and a rotatable body, a circuit means having a light-response means and a variable resistor means for variably positioning said movable pointer, distance setting means having cam means for angularly deflecting said body of the galvanometer according to a selected distance value, changing means having daylight, flash and manual exposure ranges and having three cam means, the first cam means of said changing means preventing coupling between said cam means of the distance setting means and said body of the galvanometer when said changing means is set to said daylight exposure range, said second cam means coupling said light-responsive means in said circuit means, said third cam means coupling in said circuit means said variable resistor means to set the resistance value according to an adjusted guide number when said changing means is set to said flash light exposure range, and means cooperative with said pointer and operably connected to said diaphragm means to variably set the value of said diaphragm aperture in dependence upon the deflected position of said pointer.

7. A photographic camera comprising light responsive means, first and second variable resistor means each having resistance values, a diaphragm means operable to define an exposure aperture for effecting photographic exposure, a galvanometer comprising a movable coil having a pointer theron, circuit means connectable with said light responsive means and both of said variable resistor means, changing means having daylight, flash and manual exposure ranges and having three cam means, distance setting means having a distance cam means, the first cam means of said changing means coupling said circuit means and said light responsive means when said changing means is set to said daylight exposure range, the second cam means coupling said circuit means and said first variable resistor means for adjusting the resistance value according to a selected distance value under control of said distance cam when said changing means is set to said flash light exposure range, said third cam means coupling said circuit means and the second variable resistors means for adjusting its resistance value according to a manually selected aperture value when said changing means is set to said manual exposure range.

References Cited

UNITED STATES PATENTS

| 3,072,028 | 1/1963 | Lange. |
| 3,127,822 | 4/1964 | Kiper. |
| 3,283,681 | 11/1966 | Singer et al. |
| 3,285,149 | 11/1966 | Fahlenberg et al. |
| 3,326,107 | 6/1967 | Rentschler. |

NORTON ANSHER, Primary Examiner

J. F. PETERS, Jr., Assistant Examiner

U.S. Cl. X.R.

95—64